E. C. POOL.
ELECTRIC WEIGHING SCALE.
APPLICATION FILED NOV. 12, 1914.
1,359,272.
Patented Nov. 16, 1920.
3 SHEETS—SHEET 1.
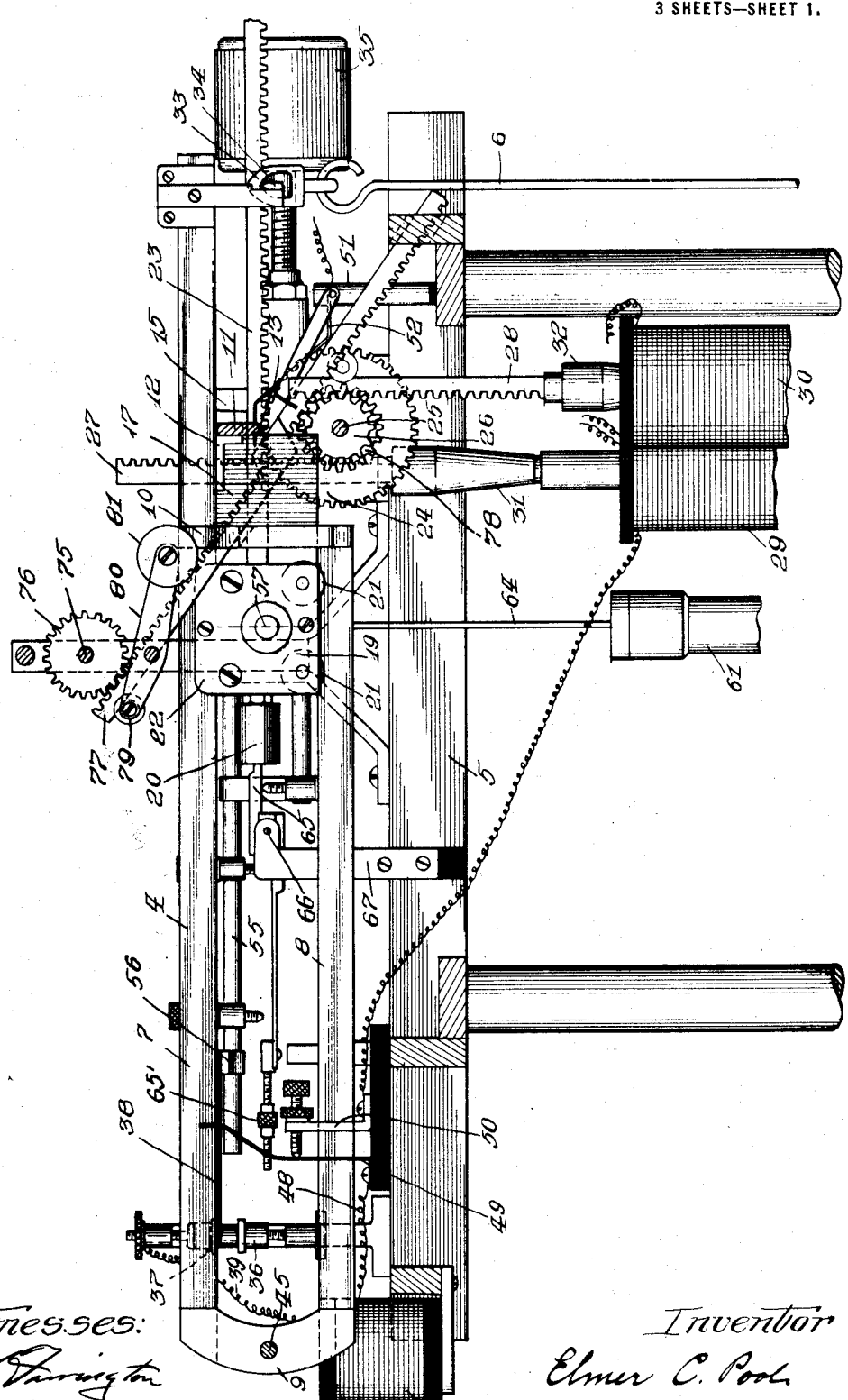

E. C. POOL.
ELECTRIC WEIGHING SCALE.
APPLICATION FILED NOV. 12, 1914.
1,359,272.
Patented Nov. 16, 1920.
3 SHEETS—SHEET 2.
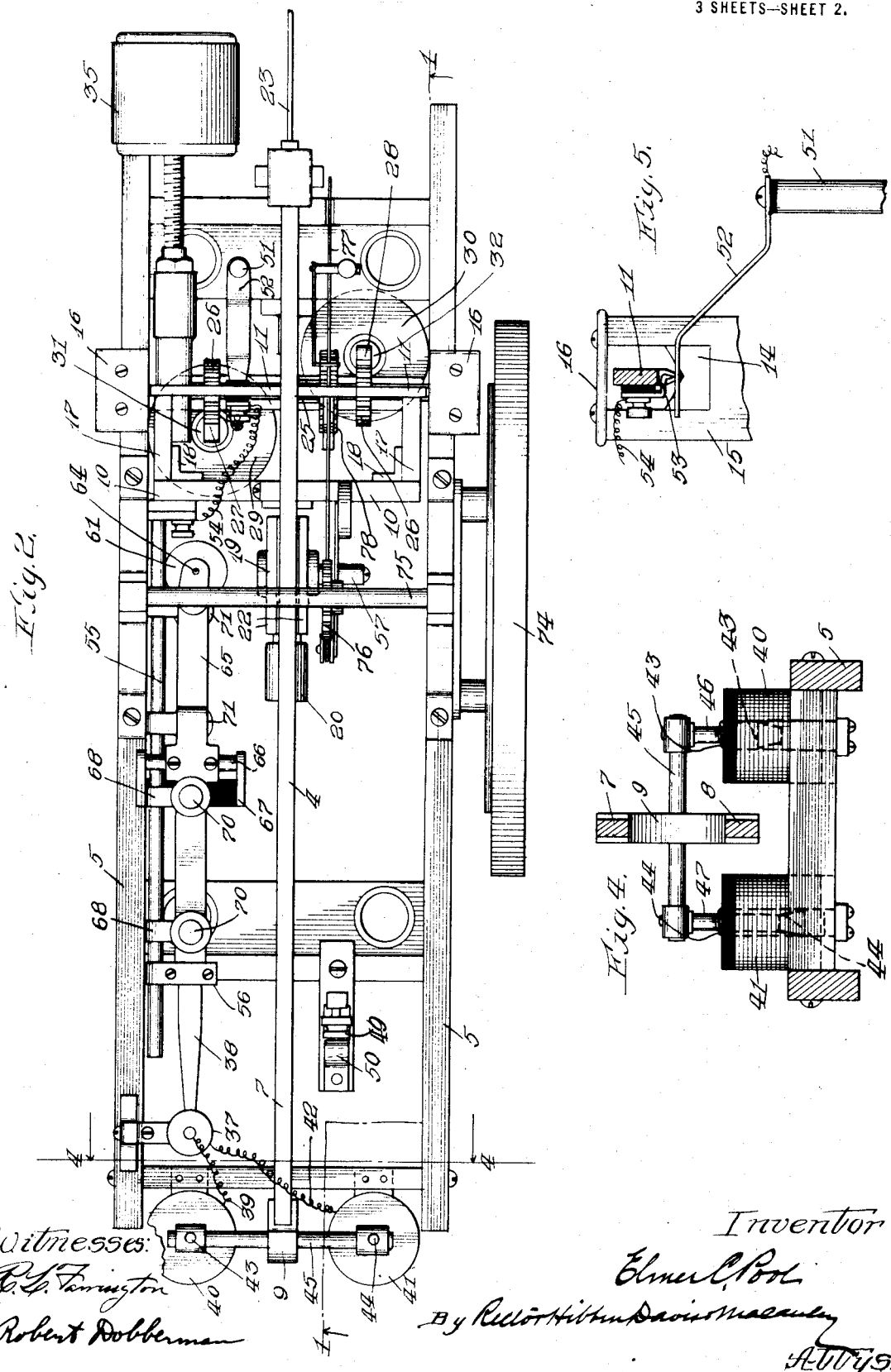

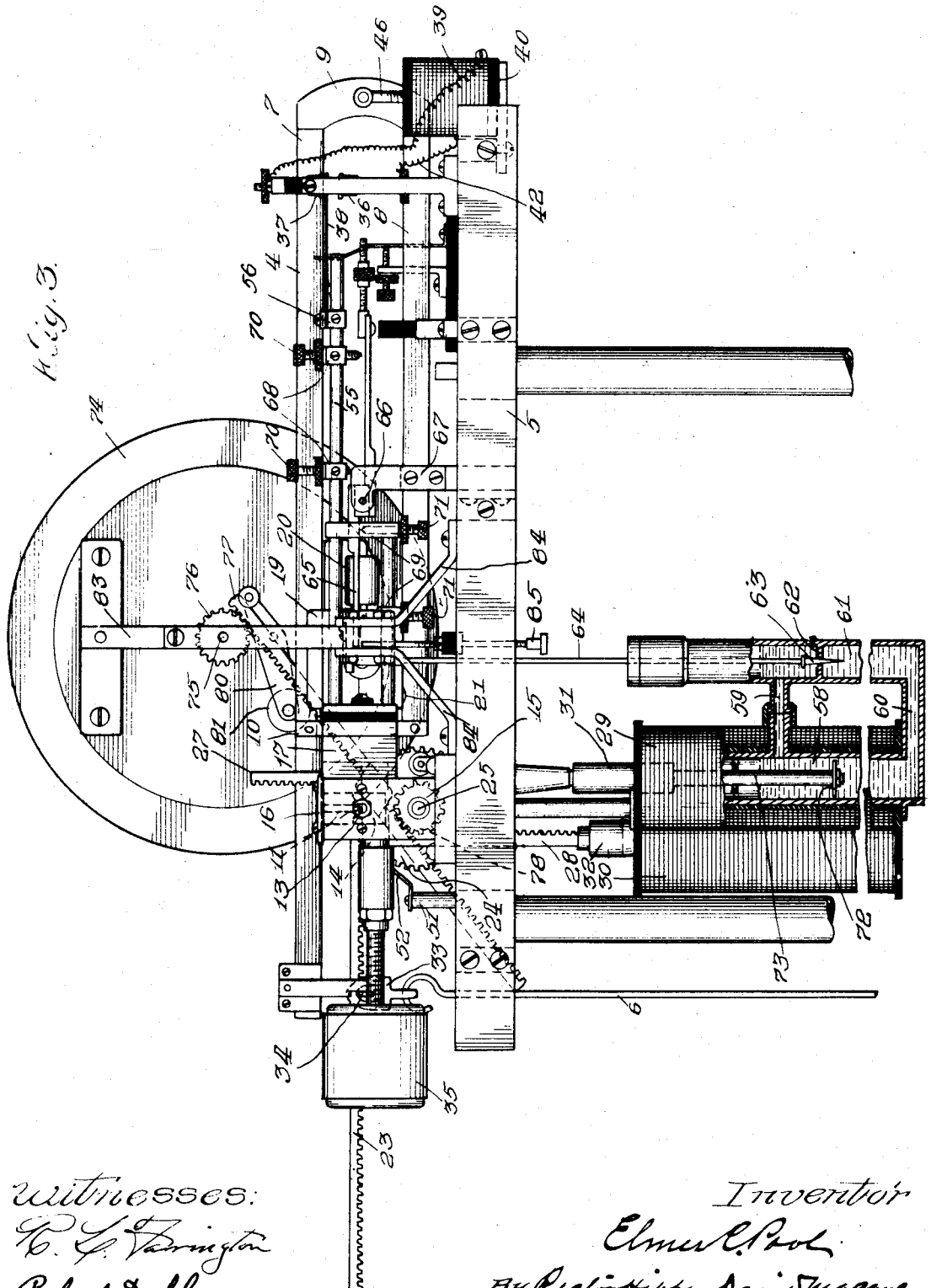

UNITED STATES PATENT OFFICE.

ELMER C. POOL, OF NEWCASTLE, PENNSYLVANIA, ASSIGNOR TO TOLEDO SCALE COMPANY, OF JERSEY CITY, NEW JERSEY, A CORPORATION OF NEW JERSEY.

ELECTRIC WEIGHING-SCALE.

1,359,272.      Specification of Letters Patent.      Patented Nov. 16, 1920.

Application filed November 12, 1914. Serial No. 871,687.

*To all whom it may concern:*

Be it known that I, ELMER C. POOL, a citizen of the United States, residing at Newcastle, county of Lawrence, and State of Pennsylvania, have invented certain new and useful Improvements in Electric Weighing-Scales, of which the following is a specification.

My invention relates more particularly to that form of electric weighing scale in which the scale beam carries a poise which is automatically fed outward along the beam, after a load has been placed on the scale until it counter-balances the load. When the scale is in equilibrium the current through the poise-actuating means is cut off. In the scales of this character heretofore constructed or attempted difficulty has been found in accurately adjusting the poise to a position of equilibrium and more especially in so adjusting it within a reasonable period of time largely because the momentum of the poise carries it beyond a position of exact equilibrium and it is fed back and forth a less distance each time until finally it stops at about the desired position but only after consuming considerable time. In my invention the scale is so constructed that the poise is fed accurately to the desired position with little or no reversal of movement and consequent consumption of time.

In the accompanying drawings I have shown my invention as embodied in a scale of the ordinary beam type. Obviously, however, the specific character of the scale is immaterial and further the construction may be widely varied from that shown which is the preferred form. The specific disclosure, however, is for the purpose of exemplification and in the following claims I have set forth the scope of my invention in terms to distinguish it from the prior art so far as known to me without, however, abandoning or relinquishing any part or feature thereof.

In the accompanying drawings Figure 1 is a vertical, longitudinal section upon the line 1—1 of Fig. 2 showing certain parts in elevation, of so much of a scale as is necessary to an understanding of the invention embodied therein. Fig. 2 is a plan of the scale; and Fig. 3 a rear view in elevation; Fig. 4 a transverse section on line 4—4 of Fig. 2; and Fig. 5 a side sectional elevation of a detail.

Each part is identified by the same character of reference wherever it occurs in the several views.

The drawings show only the beam 4 and its connections and the standard or support 5 upon which it is mounted, and it will be understood that the link 6 is connected to the lever of a two-point bearing scale or the system of leverage of a platform scale or to any other mechanism by which the weight of the commodity to be weighed is transmitted to said link. The beam comprises the upper and lower longitudinal bars or members 7, 8 which, at their outer ends, are connected by the curved cross-piece 9 and at their inner ends by a cross head 10 extending upon opposite sides of said bars. The fulcrum bar 11 extends across beneath the upper bar and is secured thereto by a bracket 12, and at its outer ends is formed with the knife edges 13 which rest upon bearing blocks 14 carried by the fulcrum standards 15 which rise from the support 5. The standards are recessed to receive the bearing blocks and cover plates 16 extend over the upper edge of the fulcrum bar. The latter is braced and maintained in position by side blocks 17 which are connected at their respective ends to said fulcrum bar and the cross head 10 by angle pieces 18.

The poise comprises a carriage 19 and an adjustable weight 20 which is threaded and adjustable upon a rod projecting from the carriage, and the latter is mounted upon rollers 21, which bear upon the lower bar 8. The carriage comprises cheek plates 22 which partially embrace the upper longitudinal bar of the beam and thereby support the carriage in position. A rack bar 23 extends from the rear or inner end of the carriage and is driven by and partially supported upon a gear wheel 24 secured to a transverse journal 25, the point of contact of the rack and gear wheel being in the line of the knife edges of the fulcrum so that these parts do not in any way interfere with the rocking of the beam. Said shaft 25 is journaled in the standards 15 at its opposite ends and also carries, upon opposite sides of said gear, pinions, 26 which are for the purpose of turning the shaft in opposite directions and thereby feeding the poise in or out as may be required. These pinions are respectively engaged by the racks 27, 28, which racks are located upon opposite sides of said shaft and actuated by a pair of solenoids 29, 30, the cores 31, 32 of which are connected to the racks for this purpose, and the coils of the solenoids are so connected as will presently appear that when the long arm of the beam rises as, for example, when an article to be weighed is placed upon the scale platform, solenoid 29 is energized to pull down its core and so cause the poise to be fed outward to a position to counterbalance the article. But when the longer arm of the beam falls as, for example, when the poise has been fed out too far or the article to be weighed has been lifted from the platform the solenoid 30 is energized to retract its core and draw the poise inward or toward the fulcrum of the beam. Before describing the electrical connections I would say that the link 6 connecting the beam to the platform is as usual connected by a stirrup 33 to knife edges 34 upon the short end of the beam and an adjustable weight 35 is provided for sealing the scale.

The solenoids 29 and 30 are suitably mounted upon the stationary structure of the scale and their coils are connected respectively to lower and upper contacts 36, 37 which are engaged respectively by a spring contact 38 on the beam accordingly as the beam is in its upper or lower position. Normally, however, when the beam is in equilibrium the contact finger 38 is intermediate the stationary contacts. Each of the stationary contacts is adjustable in a well-known manner and carries a carbon block for making contact and a block of similar or equivalent material is carried by the contact finger. The upper contact is connected by a wire 39 to an auxiliary solenoid 40 which is one of a pair mounted upon the support 5, the other member 41 of the pair being in electrical connection with the lower stationary contact by a wire 42. The cores 43, 44 of said solenoids are connected to a cross piece 45 carried by the curved bar 9 of the beam, being connected thereto by screws 46, 47 upon which said cores are adjustable. Solenoid 40 which, as above described, is connected to the upper stationary contact is connected by a wire 48 with resilient member 49 of a switch mounted upon the support 5, a stationary and adjustable contact 50 of said switch being connected to the solenoid winding 29. The purpose of the switch will presently appear. The other auxiliary solenoid 41, which, as before stated, is connected to the lower contact 36, is also connected to the solenoid 30. From these main solenoids, there is a connection to one side of the source of electrical energy. The other side of the source of electrical energy is connected to the finger 38 above mentioned through post 51 supported by but insulated from the support 5, a constantly closed spring contact 52 bearing upon a knife edge contact 53, (see Fig. 5) the edge of which is in line with the fulcrum knives and which is supported upon but insulated from the fulcrum bar, and connected by a wire 54 with longitudinal rod 55 carried by the beam and which carries a bracket 56 at its outer end in which said finger 38 is mounted. It will thus be seen that a closed electrical connection is formed from said finger to the source of electrical energy without in any way interfering with the movement of the movable parts of the scales. When the beam is in its upper position the circuit is closed through the auxiliary coil 40 and main coil 29 but when the beam is in its lower position the circuit is closed through the other auxiliary and main coils. The purpose of the main coils has been explained. The purpose of the auxiliary coils is to prevent the poise overrunning. With this end in view the movable core of solenoid 40 is adjusted to be normally materially above the center of the coil, and the core of solenoid 41 on the contrary is adjusted to be normally materially below the center of the solenoid core (see Fig. 4). With this adjustment, when the beam is elevated with the finger 38 in engagement with the upper contact coil 40 exerts a downward pull upon the beam so that it moves away from the upper contact before the poise which is being fed outward by the action of solenoid 29 reaches the position of equilibrium, and therefore the current through both the main and auxiliary solenoids is cut off in advance of the condition of equilibrium, but the impetus or momentum of the poise carries it outward for a greater or less distance after the feeding action of the main solenoid is interrupted. Therefore by suitably adjusting the core of solenoid 40 the beam can be made to drop and open the circuit with the poise at such a point that it just has sufficient momentum to reach the position of equilibrium. Likewise when the poise is being fed inward by the solenoid 30 the auxiliary solenoid 41 starts the beam upward before the poise reaches the position of equilibrium and in this manner prevents overthrow. By a suitable adjustment of both these poises the scale may be quickly brought into equilibrium.

As above observed the circuit through solenoids 29 and 40 leads through the switch having the members 49, 50. The carriage of the movable poise has upon the side thereof adjacent said switch an outwardly extending spur or finger 57 and the resilient member of the switch is arranged in the path thereof but quite near the outer end of the beam. If for any reason, as by the dropping of a heavy weight upon the scale platform, the poise is driven violently out the spur strikes the resilient switch and opens the same before it can reach the outer limit of its movement. The energizing current is thus cut out of the solenoid 29 so that the poise may come to rest by failure of the energizing means rather than by being abruptly stopped by the end of the beam.

In order to control the speed of movements of the scale beam I provide a dashpot therefor which is in some respects similar to the dashpot shown in my application Serial No. 825,672, filed March 23, 1914. Preferably this dashpot is attached to and extends into the under end of solenoid 29 and comprises a cylinder 58 with a by-pass comprising upper and lower passages 59, 60 and a vertical passage 61. The vertical passage is formed with constricted opening 62 with which a tapering valve or controller 63 coöperates. The latter is attached by a stem 64 to one end of a walking beam or lever 65 which is pivoted at 66 to a bracket 67 mounted upon the support 5 and carries an adjustable counterweight 65'. Rod 55 heretofore mentioned carries two pairs of brackets 68, 69, the members 68 of one pair carrying set screws 70 which are arranged above and adapted to engage the walking beam on one side of its pivot, while the brackets 69 extend around and below the walking beam on the other side of the pivot and also carry set screws 71 also adapted to engage said walking beam but upon the under side thereof. All of the set screws, however, tend to turn the walking beam in the same direction. When the beam is in its normal or intermediate position the set screws are out of contact with the beam but when the main beam is materially displaced in either direction the set screws come in contact with the walking beam and swing the latter which has the effect of more or less opening the passage 61 in the by-pass to permit the flow of liquid therethrough. A piston 72 in the cylinder of the dashpot is attached by a rod 73 to the core of solenoid 29. The piston and consequently the solenoid and the beam to which it is connected are permitted to move more or less rapidly according as the tapered valve 63 is more or less raised from its seat and the passage through the latter correspondingly opened. Said valve is open more or less according to the extent to which the walking beam has been displaced by the main beam. Therefore the movement of the beam permitted by the dashpot is more or less rapid accordingly as said beam is more or less removed from its normal position and as it returns toward the normal the dashpot slows down the movement of the beam. In order to still further accentuate this action of the dashpot the two adjusting screws nearest the pivot of the walking beam are so adjusted as to come into contact with the latter materially after the corresponding outer or more remote adjusting screws come into contact therewith. That is to say, when the main beam is moved the outer contact screw first engages the walking beam and moves it slowly to open the valve but if the movement of the main beam is sufficient then the contact screw nearer the pivot of the walking beam engages the latter and because of the shorter radial distance moves the valve in the dashpot more rapidly away from its seat. Thus the more extreme the movement of the scale beam the wider the valve is thrown open but as the beam returns toward the intermediate position the valve correspondingly returns to its seat.

In order to indicate the weight of the article upon the scale pan or platform I provide a dial 74, the hand whereof is journaled at 75 and carries a pinion 76 which engages a rack 77 which in turn is engaged by a pinion 78 upon the shaft 25 to actuate the hand.

As shown in Fig. 1 of the drawings, the rack 77 is formed upon its opposite edges with teeth to engage the pinions 76, 78; and it is maintained in engagement with the former by a roller 79 mounted upon the end of a swinging arm 80, the other end of which carries a weight 81. The rack is further provided with a forked guide 82 which is mounted upon the post 51 hereinbefore referred to. The dial is carried by a post 83 mounted by braces 84—84 upon the support 5 and the shaft or journal of the dial hand is suitably mounted in post 83. An adjustable stop 85 limits the movement of the walking beam 65.

The operation of the scale has been described in detail in connection with the description of the various parts thereof. The general operation, however, may be briefly described as follows: When a load is put upon the scale platform or weight receptacle the link 6 tilts the beam so that the flexible tongue 38 is thrown into engagement with the upper contact 37. A current is thus established through the circuit heretofore described which includes the main solenoid 29 and the auxiliary solenoid 40. The former, through the mechanical connections detailed above, drives the poise outward and the auxiliary solenoid exerts a downward pull upon its core. Thus, before the counterpoise is in the position in which the beam is in equilibrium, the latter is drawn downward, opening the circuit and relieving the beam of the pull of the auxiliary solenoid 40 and also deënergizing solenoid 29 when the poise has reached such a point that its momentum will just suffice to carry it to the position of equilibrium. If the poise, however, is carried beyond the position of equilibrium, the position of the beam is reversed, throwing the current through the main solenoid 30 and auxiliary solenoid 41 whereby the beam and poise are acted upon in the manner above described but in the opposite direction. The speed of movement of the parts is regulated by the dashpot, as above described, being cut down as the beam approaches its normal or intermediate position.

It will be seen that in my construction the position of equilibrium of the beam is attained with the minimum of lost motion of the parts or overthrow and in the shortest possible space of time.

As above stated, the specific disclosure is for the purpose of exemplification only and many changes may be made within the scope of my invention. Thus, for example, electromagnets or other means may be substituted for the auxiliary solenoids employed for the purpose of starting the beam from its extreme position before the poise has reached a position of equilibrium.

I claim—

1. In a scale of the class described having a normally balanced beam, a poise adjustable thereon, and means under control of the position of the scale beam for automatically feeding the poise along the beam to restore equilibrium when the beam is displaced by a load, means actuated simultaneously with said feeding means for impelling the beam toward its normal position before the poise reaches a position of equilibrium, and ceasing its action simultaneously with said feeding means.

2. In a scale of the class described and in combination with the normally balanced beam, poise sliding thereon for offsetting the weight of a load, and means under control of the position of the scale beam for automatically actuating the poise, means acting on the beam when in one extreme position tending to return it toward normal, and means acting upon the beam when in the other extreme position tending to return it toward normal, said beam-returning means being actuated from the same force as the poise actuating means.

3. In a scale of the class described and in combination with the normally balanced beam, poise adjustable longitudinally thereof and means for adjusting the poise, electromagnetic means acting on said beam and tending to return it to normal position, and a switch in the circuit of said electromagnetic means and adapted and arranged to be closed when the beam is in one extreme position and opened when the beam leaves said position.

4. In a scale of the class described and in combination with the normally balanced beam, poise adjustable longitudinally thereof, and means for adjusting the poise, an electromagnetic means, one of the members of which is connected to the beam, and a switch in the circuit of said electromagnetic means controlled by the beam and adapted to close the circuit through said electromagnetic means when the beam is in an extreme position whereby said electromagnetic means tends to move the beam toward normal position.

5. In a scale of the class described and in combination with the normally balanced beam, poise movable longitudinally thereof, and means for adjusting the poise, a solenoid, a core for said solenoid attached to the beam and adapted, when the solenoid is energized, to exert a downward pull upon the beam, a switch in the circuit of the solenoid and controlled by the beam whereby the circuit is closed through the solenoid when the beam is in its upper position and opened when the beam moves toward its normal position.

6. In a scale of the class described and in combination with the normally balanced beam, poise adjustable longitudinally thereof, and means for adjusting the poise, a pair of electromagnetic means, one of which, when energized, tends to move the beam downwardly and the other of which, when energized, tends to move the beam upwardly, a switch operated by the beam and arranged to close the circuit through one or the other of said electromagnetic means according as the beam is in its upper or lower position and to open the circuit through both electromagnetic means when the beam is in immediate position, each electromagnetic means acting to move the beam from the position in which its circuit is closed before the poise is in the position of equilibrium.

7. In a scale of the class described and in combination with the normally balanced beam, poise reciprocable longitudinally thereon, and means for reciprocating the poise, a pair of solenoids 40, 41, cores 43, 44 for the respective solenoids attached to the beam and tending, when their respective solenoids are energized, to move the beam in opposite directions, a switch carried by the beam, upper and lower contacts with which the switch engages, the upper contact being connected with the solenoid 40 by which the beam is drawn downwardly, and the lower contact being connected with the solenoid 41 by which the beam is thrust upwardly, and connections from said switch and solenoids to a source of electrical energy.

8. In a scale of the class described and in combination with a normally balanced beam, a poise reciprocable longitudinally thereof, a solenoid 29 connected to the poise for moving it outwardly along the beam, and a solenoid 30 connected to the poise for moving it inwardly along the beam, an auxiliary solenoid 40 electrically connected to solenoid 29, a core for said auxiliary solenoid connected to the beam and adapted, when the solenoid is energized to draw the beam downward, an upper contact 37 connected to said auxiliary solenoid, a second auxiliary solenoid 41 electrically connected to main solenoid 30, a core for solenoid 41 attached to the beam and acting, when its solenoid is energized, to thrust the beam upward, a lower contact 36 in electrical connection with solenoid 42, a contact actuated by the beam and adapted to close the circuit through stationary contacts 36—37 respectively accordingly as the beam is in its lower or upper position, and connections to a source of electrical energy.

9. In a scale of the class described and in combination with the normally balanced beam and the poise movable longitudinally thereof, a rack on said poise, electromagnetic means and mechanical connections for actuating said rack comprising a rotary shaft, a pinion on said shaft, a rack operated by said pinion, a dial, the hand coöperating with the dial, a pinion on the shaft of said hand with which said rack engages, and means for maintaining the rack in engagement with said pinion.

10. In a scale of the class described a main beam, a poise reciprocable along said beam, means for reciprocating the poise, a dashpot having the piston thereof connected to said actuating means, a by-pass connecting the opposite ends of said dashpot and a diaphragm in the by-pass having a restricted opening therein, a regulator coöperating with said opening, a walking beam to which said regulator is connected, and two pairs of stops connected to the main beam and one of said pairs adapted to engage one arm of the walking beam and the other pair of stops adapted to engage the other end of the walking beam.

11. In a scale of the class described, a normally balanced beam, a poise adjustable thereon, means under control of the scale beam for automatically feeding the poise along the beam to restore equilibrium when the beam is displaced by a load, means for impelling the beam toward its normal position before the poise reaches a position of equilibrium and means for setting in motion the impelling means.

12. In a scale of the class described, a normally balanced beam, a poise adjustable thereon, means under control of the scale beam for feeding the poise along the beam to restore equilibrium when the beam is displaced by a load, means for impelling the beam toward its normal position before the poise reaches a position of equilibrium and means including an electric circuit for setting in motion the impelling means.

13. In a scale of the class described having a normally balanced beam, a poise adjustable thereon, and means for feeding the poise along the beam, including a gear wheel mounted adjacent the fulcrum of the beam, said poise comprising a carriage, a weight mounted upon said carriage and adjustable longitudinally of the beam, and a rack secured to said carriage and meshing with said gear wheel in line with the fulcrum of the beam.

14. In a scale of the class described, a normally balanced scale beam, a poise adjustable thereon, means for feeding the poise along the beam, a dash pot having the piston thereof connected to said feeding means, a by-pass connecting the opposite ends of said dash pot and a diaphragm in the by-pass having a restricted opening therein, a regulator arranged to vary the effective area of said opening, a walking beam with which said regulator coöperates, and stops carried by the scale beam and arranged to engage said walking beam to move the regulator relatively to said opening.

ELMER C. POOL.

Witnesses:
ANNA ZEIGLER,
J. CLYDE GILFILLAN.